May 17, 1949.   C. W. MacMILLAN   2,470,709
ENGINE COMBUSTION CONTROLLING DEVICE
Filed May 23, 1946   5 Sheets-Sheet 1
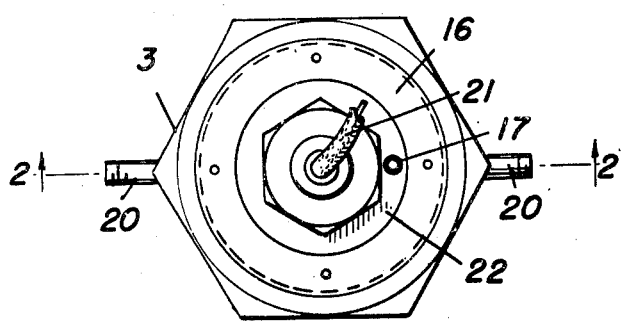
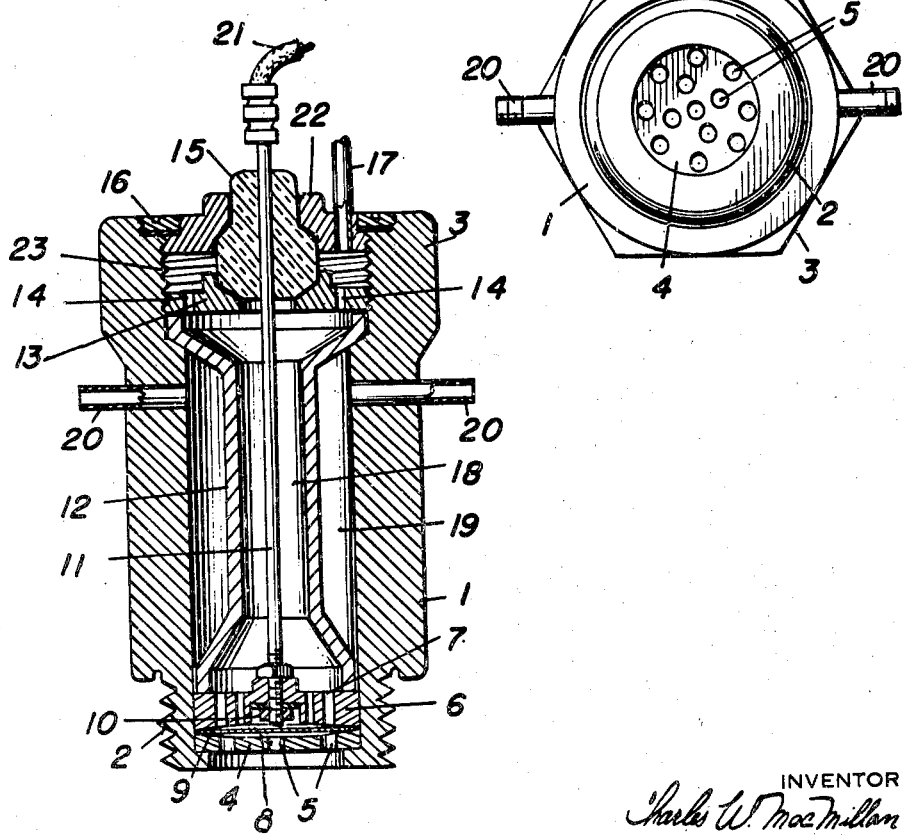
INVENTOR
Charles W. MacMillan

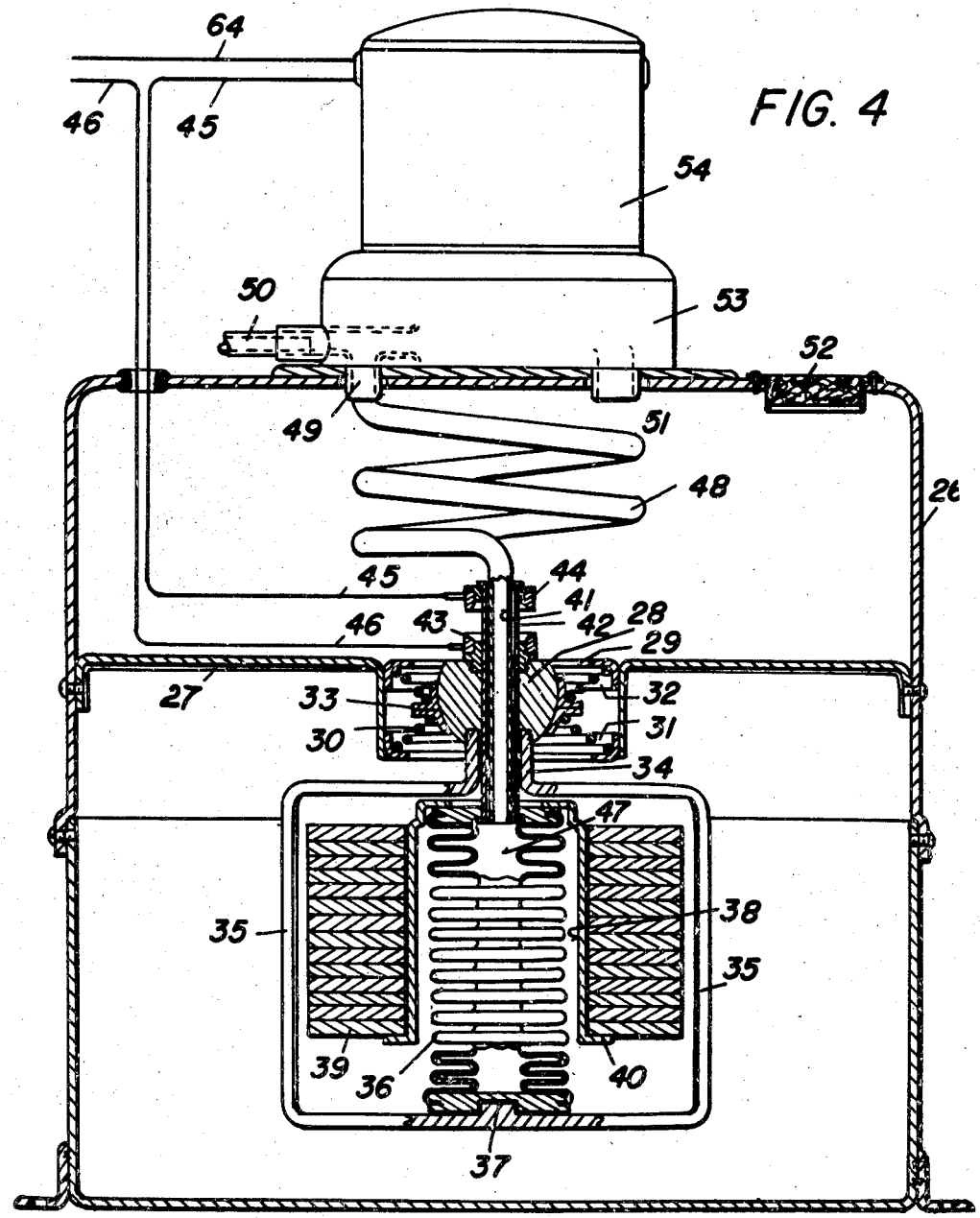

May 17, 1949.   C. W. MacMILLAN   2,470,709
ENGINE COMBUSTION CONTROLLING DEVICE
Filed May 23, 1946   5 Sheets-Sheet 3

INVENTOR
Charles W. MacMillan

May 17, 1949.  C. W. McMILLAN  2,470,709
ENGINE COMBUSTION CONTROLLING DEVICE
Filed May 23, 1946  5 Sheets-Sheet 4

INVENTOR
Charles W. MacMillan

Patented May 17, 1949

2,470,709

UNITED STATES PATENT OFFICE 2,470,709

ENGINE COMBUSTION CONTROLLING DEVICE

Charles W. MacMillan, Alexandria, Va.

Application May 23, 1946, Serial No. 671,858

11 Claims. (Cl. 123—117)

This invention relates to systems for controlling or regulating combustion in internal combustion engines, and particularly to engine indicator devices as applied to automatic adjustment of ignition, air-fuel ratio, and fuel injection timing.

Employment of engine indicators in engineering laboratory work for exploring phenomena occurring in the combustion chambers of engines is well known, and many different types of apparatus have been devised for this purpose. One of the principal difficulties encountered with apparatus of this type has been the provision of a satisfactory pressure-responsive unit to be inserted in the engine cylinder head, in contact with combustion chamber gases. One of the most successful types of indicator devices in use is constructed with a "balanced diaphragm" in the pressure-responsive unit. The balanced diaphragm type of engine indicator variously known as the "Bureau of Standards" or M. I. T. indicator makes use of a thin metal diaphragm one side of which is exposed to combustion chamber gases while the other side is in contact with air pressure of sufficient magnitude to prevent flexing of the diaphragm except when combustion gas pressure exceeds the balancing air pressure. Movement of the diaphragm closes an electric circuit which in turn operates appropriate mechanism for producing an exceptionally accurate average pressure-volume diagram of the engine cylinder as taken from a plurality of cycles of operation.

A primary object of this invention is to make use of the superior characteristics of the balanced diaphragm type of indicator in providing automatic regulation of combustion to the end that detonation is precluded, while economy and smoothness are obtained.

Another object is to provide accurate and durable means for maintaining a predetermined value of air pressure as supplied to a balanced-diaphragm type of engine indicator.

Another object is to provide a practical system of electrical circuits for electromechanical operation of fuel and ignition controlling devices in response to the functioning of a balanced-diaphragm type of pressure-responsive unit as mounted in the cylinder head of a spark ignition engine.

Another object is to provide a representative practical system of electrical circuits and mechanical controls for regulation of fuel injection timing in compression ignition or Diesel engines as a function of combustion chamber gas pressure.

Another object is to provide an engine indicator, responsive to combustion chamber gas pressure, in combination with permanently accurate calibration means.

Another object is to provide a device for indicating maximum combustion chamber pressure and associated apparatus for automatically producing engine operating adjustments.

Another primary object is to provide a device which is responsive to engine combustion chamber gas pressure for the purpose of controlling detonation.

Other objects and singular features of the device disclosed herein will become apparent from the description to be set forth herein.

Associated subject matter pertaining to spark ignition engine controlling devices is recorded in my Patent No. 2,394,792, dated February 12, 1946, for an "Engine ignition controlling device," and also in my co-pending application, Serial No. 621,309, filed October 9, 1945, for an "Engine fuel controlling device."

In the drawings:

Figure 1 is a sectional elevation of a representative balanced-diagram type of pressure responsive unit of an engine indicator;

Figures 2 and 3 are plan and bottom views, respectively, of Figure 1;

Figure 4 is a sectional illustration of a dead weight air pressure controlling device;

Figure 5:
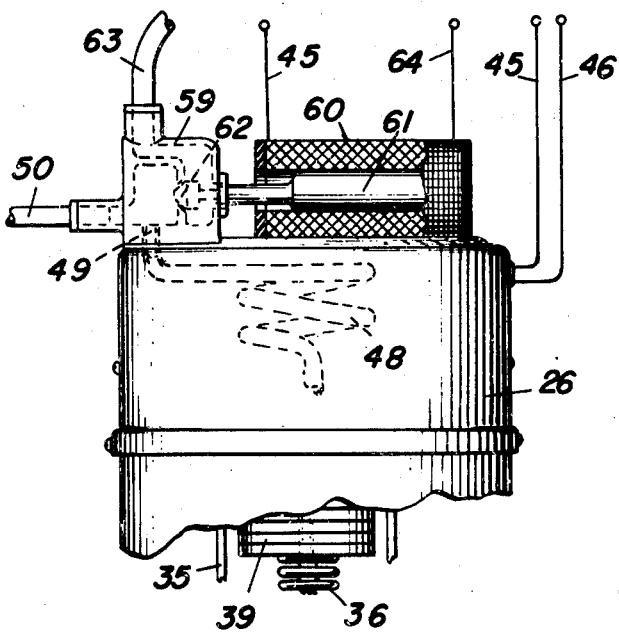
Figure 5 is a partial view of an alternative arrangement of a portion of the device shown in Figure 4.

A detailed description follows. In Figure 1 a cylindrical housing 1 having reduced threaded end 2, an internal thread 23, and hexagonal top 3, houses piece 4 with perforations 5 and piece 6 with perforations 7. Between pieces 4 and 6 a flexible diaphragm disc 8 is suspended at its periphery. Pieces 4 and 6 are slightly concave as indicated by 9 to provide for flexing movement of disc 8. Electrical contact 10 is insulated from and supported at its lower end by piece 6. Conductor 11 extends from contact 10 through ceramic insulator 16 and is in circuit with conductor 21. A circular housing 12 having expanded extremities is held pressure tight in housing 1 by means of nut 13 in which air passages 14 are drilled. Nuts 22 and 16 retain ceramic insulator 15 and seal the compartment 18 against leakage. Air pipe 17 communicates with external air pressure conducting same to compartment 18 through openings 14. Tubes 20 are optionally inserted through housing 1 for providing flow of a cooling medium through annular compartment 19, if desired.

In Figure 4 a cylindrical housing 26 contains an interior member 27 which supports a drilled spherical part 28 in socket stampings 33 by means of compression springs 29 and 30 which are held in place by cupped pieces 32 and 31, respectively. An expansion member 36 preferably of the metal bellows type is supported in a stirrup-like piece 35 being retained in alignment therein by a socket-fitting portion 37. The axial opening 47 within expansion member 36 is relatively small in diameter, and communicates with air pressure tubing 50 through tube 49, flexible high pressure tube 48, and straight tube 41, the latter being cased in tubular sliding member 42. Stirrup-like piece 35 is supported in spherical part 28 by means of a cylindrical threaded extension 34 through which sliding member 42 passes. A plurality of selected annular weights 39 preferably made of lead, is supported on extensions 40 from the lower end of inverted cylindrical cup 38 which is itself supported on the upper extremity of expansion member 36.

An electrical contact 43 is supported by, but electrically insulated from, the upper portion of spherical part 28. Electrical conductor 46 terminates at one end in contact 43. A second electrical contact 44 is carried by sliding member 42 and insulated therefrom. Electrical conductor 45 terminates at one end in contact 44 and at the other end in electric motor 54 which operates an air pump represented by 53. Electrical conductor 64 also terminates at one end in motor 54. An air inlet filter 52 is contained in housing 26. Air intake opening 51 communicates with air pump 53.

In Figure 5 a solenoid valve 62 operated by plunger 61 and winding 60 may replace the air pump 53 and motor 54 shown in Figure 4. A tube 63 is connected to an external source of air under high pressure and conducts this pressure through valve box 59 to tubes 48 and 50.

Figure 7:
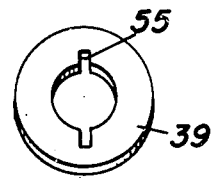
Figure 7 is a detail view of one of several weights contained in the device shown in Figure 4.
Figure 6:
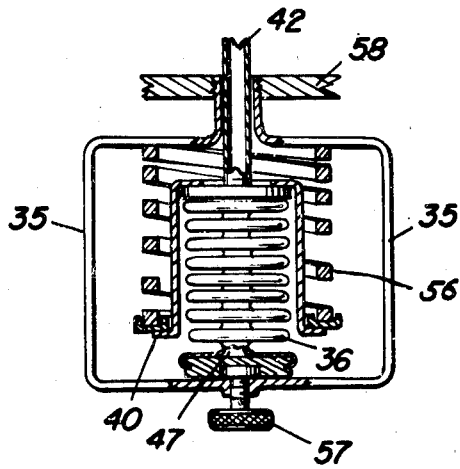
Figure 6 is also a partial view of an alternative arrangement of a portion of the device shown in Figure 4.

Figure 6 illustrates a calibrated spring 56 which may replace weights 39 shown in Figures 4 and 7. Associated with spring 56 is a calibration screw 57 which is threaded through member 35 and supports expansion member 36. In Figure 6 the spherical piece 28 and sockets 33 are eliminated and replaced by fixed support 58.

Details of a weight 39 are shown in Figure 7 in which 55 are slots permitting insertion and removal of these weights from the lower end of cup 38 when expansion member 36 is compressed.

Figure 8:
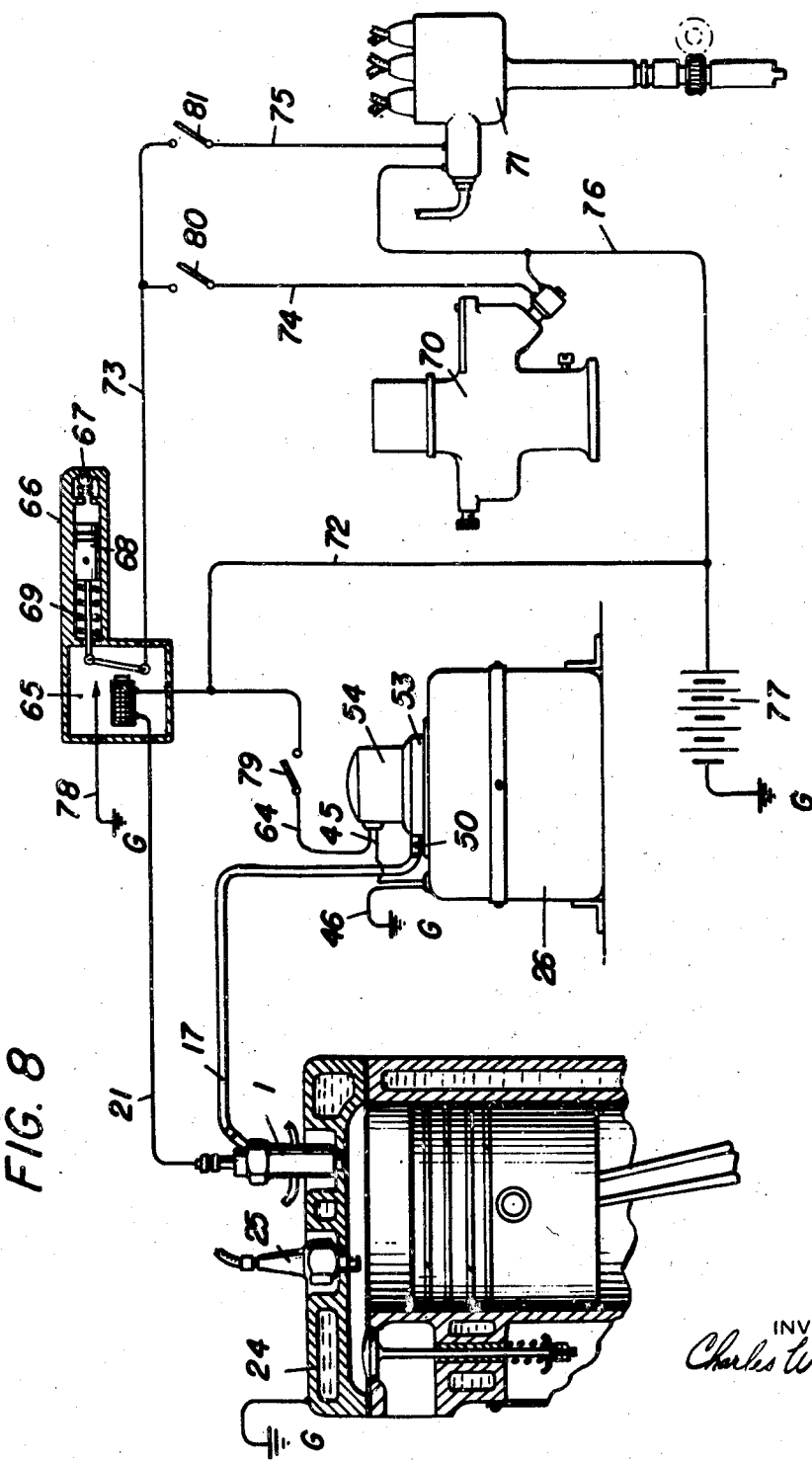
Figure 8 is a representative assembly diagram illustrating a practical combination of the apparatus of the invention as applied to a spark ignition engine.

In the representative and schematic assembly of Figure 8 an engine cylinder head 24 supports spark plug 25 and indicator housing 1. The air pressure controlling unit contained in housing 26 is connected pneumatically with the balanced diaphragm indicator through tubes 50 and 17. A current source 77 is connected in circuit with a relay 65 and conductor 21 leading to the balanced diaphragm electrical contact 10 (Fig. 1). Engine cylinder head 24 functions as an electrical ground "G" in the circuits shown. The representative circuits operated by relay 65 consist of: current source 77 with conductors 76, 74, 73 and 78 for operation of electro-magnetically controlled carburetor 70; current source 77 with conductors 76, 75, 73, and 78 for operation of electromagnetically controlled distributor 71. Optional switches 80 and 81 may be incorporated for convenience in individual servicing of subassemblies.

Relay 65 is represented as being equipped with an "opening delaying" feature consisting of piston 68, cylinder 66, spring 69 and air check valve 67.

For a detailed description of the means for controlling fuel flow in carburetor 70 reference is made to my copending application Serial No. 621,309, filed October 9, 1945, for an "Engine fuel controlling device," previously referred to herein.

For a detailed description of the means for controlling ignition through distributor 71 reference is made to my Patent No. 2,394,792, dated February 12, 1946, for an "Engine ignition controlling device," also previously referred to herein.

Figure 9:
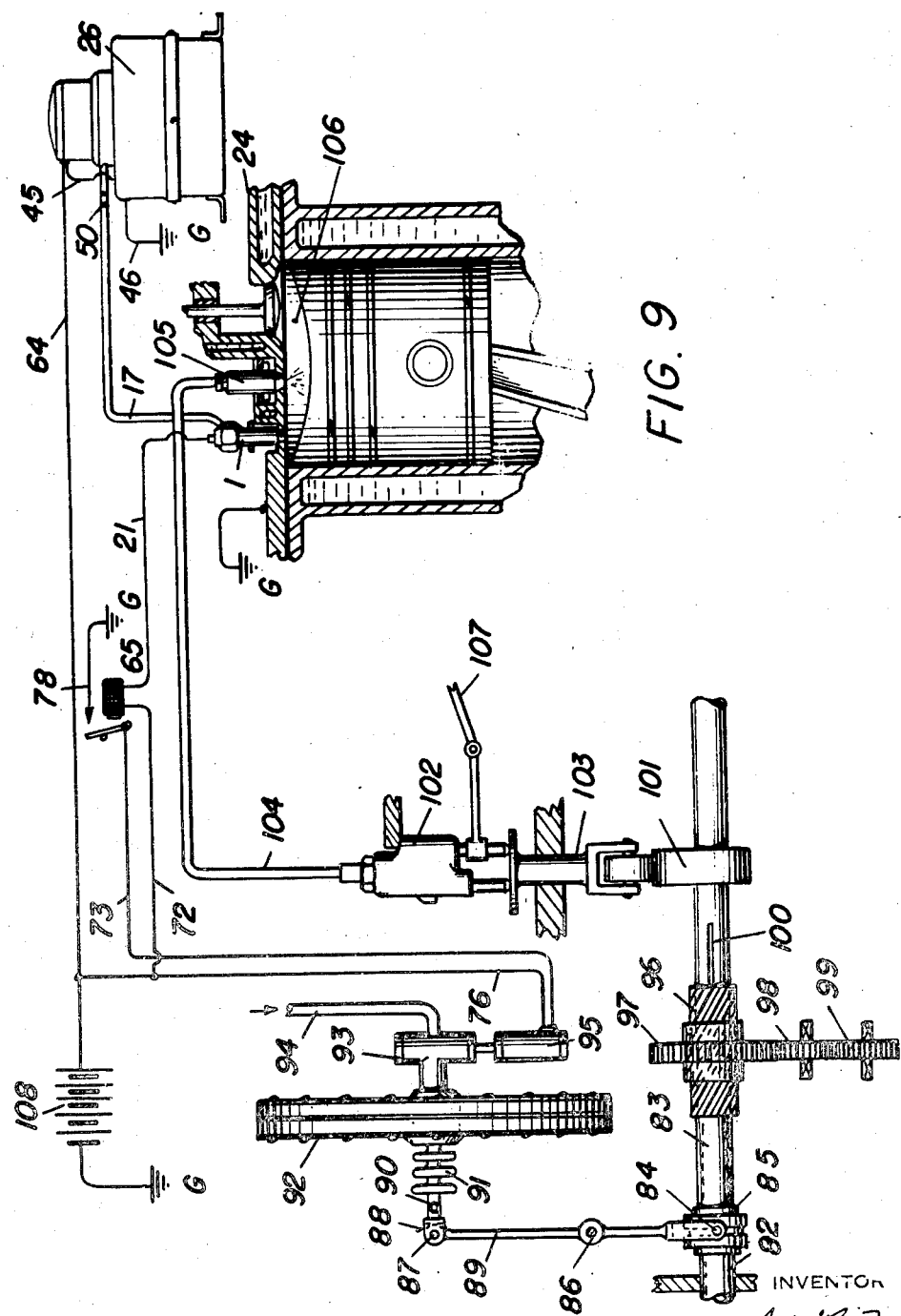
Figure 9 is a representative assembly diagram illustrating a practical combination of the apparatus of the invention to a compression ignition engine.

In Figure 9 the representative and schematic illustration of the application of the devices disclosed herein to a compression-ignition engine includes fuel injector 105 connected by fuel pipe 104 to pump 102 having manual control arm 107. Lifter 103 is in operating contact with pump 102 and rides on cam 101 which is integral and rotates with shaft 82. A hollow sleeve 83 having an external spiral splined portion 96 and yoke thrust bearings 85 is slidably keyed on shaft 82 by means of an internal key which slides freely in slot 100. Splined portion 96 slidably fits internal splines cut through the hub of gear 97. Gears 98 and 99 represent an idler and crankshaft driven gear, respectively. Shifting yoke 84 is operably linked with vacuum power "booster" unit 92 through arm 90 with yoke 88, pin joint 87, lever 89, and fulcrum point 86. A flexible boot seal 91 encloses the connection of arm 90 with "booster" unit 92.

"Booster" unit 92 is representatively operated by a solenoid 95 and valve 93, which controls vacuum through pipe 94 which may be connected to the engine intake duct or other vacuum source. Obviously, compressed air may be used to operate "booster" 92 by a minor adjustment such as connecting pipe 94 to the opposite side of "booster" 92 through valve 93.

The balanced-diaphragm indicator pneumatic and electrical arrangement, as illustrated in Fig. 9, is functionally the same as previously described in connection with Figure 8, except for the obvious difference in electromagnetically operated engine regulating subassemblies. In Figure 9 engine cylinder head 24 is an electrical "ground" and supports injector body 105 as well as balanced diaphragm indicator body 1. Air pressure controlling unit contained in housing 26 is pneumatically connected with indicator 1 through tubes 17 and 50. Electric current source 108 is connected in circuit with relay 65 and electric contact 10 (Fig. 1). The circuit operated by relay 65 consists of current source 108, conductors 76, 73, 78 and solenoid 95.

It is desired to point out that the use of air and air pressure in operation of the balanced-diaphragm indicator unit described and illustrated herein and particularly in connection with Figures 1 and 4, may be replaced with any suitable gas such as nitrogen or carbon dioxide merely by providing a container of such gas connected to inlet 51 of Figure 4 or pipe 63 of Figure 5.

For an understanding of the operation of the device and to clearly distinguish between what is old and what is believed to be new in this art, operation of the conventional balanced-diaphragm indicator unit of Figure 1 will first be briefly described. As combustion takes place in the engine combustion chamber, the pressure developed is instantly transmitted to diaphragm disc 8 through perforations 5. Disc 8, however, is prevented from bending upward due to controlled air pressure exerted constantly against its upper surface. This pressure is transmitted through tube 17, openings 14, space 18, and perforations 7. As long as the maximum combustion chamber pressure is equal to or less than the controlled air pressure, diaphragm 8 will not bend upward. However, if the maximum combustion chamber pressure exceeds the balancing controlled air pressure by a small amount, say 2 or 3 pounds per square inch, diaphragm 8 will move upward against contact 10, thus completing the electric circuit for operation of relay 65 (Figures 8 and 9). For engineering laboratory purposes, balancing air pressure applied to the upper side of diaphragm 8 is varied throughout the pressure range of the piston cycle to the end that electrical recording means timed with intervals of crankshaft rotation produce a pressure-displacement diagram or "indicator card" of the engine cylinder in question. Conventional means for providing controlled air pressure has been either by air pump, or use of an external compressed air source, both methods employing a calibrated spring for pressure determination.

Heretofore, in practice, the use of engine indicators, and particularly the pressure-responsive units associated therewith, has been limited to laboratory applications. Since the nature of laboratory applications is such that frequent recalibration of apparatus is a routine matter, no outstanding effort has been made to provide permanently accurate pressure control means which are adaptable to commercial usage and unaffected by the changes of time. The pressure control unit as described and illustrated in Figure 4 is disclosed as a novel means for providing such a permanently accurate device.

Since conventional applications of the balanced-diaphragm indicator, including associated air pressure controls, have been of laboratory character for producing pressure-volume diagrams, the combination wherein engine subassemblies are made self-adjusting in response to combustion chamber gas pressure, through the medium of the apparatus described herein, is regarded as new in the art.

In the operation of the complete device disclosed herein, it is contemplated that all of the apparatus will be mounted on the engine in aircraft, marine, land vehicle, or stationary applications. Pressure control unit housing 26 is preferably bracket supported on top or side of the engine and in an approximately vertical position. Weights 39 are selected to provide a definite force downward on the upper end of expansion member 36 due to the acceleration of gravity. The force so exerted tends to compress member 36 and force the air contained therein out through tubes 41, 48, 49, 50, and 17 into space 18 (Figure 1) of the pressure-responsive unit. As expansion member 36 becomes compressed, member 42 slides downward through spherical piece 28 until electrical contact 44 closes circuit with contact 43. Current then flows from current source 77 through conductors 72, 64, 45, and 46 causing motor 54 to operate air pump 53. Air pressure is thus built up to a value sufficient to expand member 36 upwardly until electrical contacts 43 and 44 separate, thus opening their circuit and stopping the motor and pump. It is apparent that the unit pressure maintained by the periodic and automatic operation of motor 54 will be identical with the unit pressure bearing on the upper side of diaphragm 8 (Figure 1). Furthermore, the relatively high value of balancing pressures required in practice is maintained through the gravity balancing action of weights 39 as a result of constructing member 36 with a relatively small axial opening 47. High unit air pressure thus results from a compact group of weights 39. Spherical piece 28 and sockets 33 provide for maintenance of member 36 in a vertical position within reasonable limits. This feature is desirable due to variations in the angular position of engines mounted in moving vehicles or aircraft, and eliminates any variations in the force produced by weights 39 on member 36 which might occur due to slopes. Obviously, the motor and pump must be capable of pumping at pressures greater than the maximum combustion pressure to be balanced.

By applying the required number of weights 39 to maintain a desired balancing pressure against diaphragm 8, contact 10 will remain in open circuit condition until combustion chamber pressure exceeds this balancing pressure. By selecting a balancing pressure equal to that at which detonation tends to occur in the engine, diaphragm 8 will close circuit with contact 10 when this pressure is exceeded within the combustion chamber. Current then flows from current source 77 through conductors 72 and 21 operating relay 65.

The self-regulating features of engines to which the device disclosed herein is applied are operated by relay 65. These consist primarily of air-fuel ratio control means in which current flows from source 77 (Figure 8) through conductors 76, 74, 73, and 78 producing electro-mechanical adjustment of carburetor 70; also of spark ignition control means in which current flows from source 77 through conductors 76, 75, 73, and 78 producing electro-mechanical adjustment of distributor 71; and also of fuel injection timing control means in which current flows from source 108 (Figure 9) through conductors 76, 73, and 78 producing electro-mechanical adjustment of linkage trains 93, 92, 90, 89, 84, 96, 82 and 101, wherein power booster 92 causes angular adjustment of cam 101 by sliding sleeve 83 through gear 97 on shaft 82, thus altering the time of operation of lifter 103 against fuel pump 102 with its consequent fuel injection from nozzle 105 into combustion chamber 106. The regulating features described above may be applied collectively or independently to engines depending upon their design and type. All regulating features described above are primarily applicable to engines for purposes of eliminating roughness of operation stemming from combustion processes, and for purposes of precluding detonation, as well as for utilizing the maximum power thermodynamically and mechanically available in each application.

In order to avoid any tendency toward erratic operation of the complete device, such as might be produced by a series of rapid reversals of balanced diaphragm 8, it is desirable to provide a brief delay in the "return" portion of the operating cycle of the complete device. While many methods may be employed to provide such a delay a representative means is illustrated schematically in connection with relay 65 of Figure 8, wherein piston 68 draws air through check valve 67 trapping same momentarily in cylinder 66 when relay 65 closes the circuit of conductors 78 and 73. Opening of this circuit is delayed momentarily until trapped air in cylinder 66 escapes through leakage by piston 68 or valve 67. In consequence smooth and positive motion is assured in operation of the electromagnetic units of carburetor 70 or distributor 71. Obviously, the delay action desired is inherent in the vacuum booster assembly 92 of Figure 9, hence this feature may be eliminated in that application of the relay.

In the practical application of the apparatus of this device to a commercial vehicle engine, as used for example in long distance freight hauling or in passenger buses, numerous advantages are gained over engines which are not so equipped. The automatic adjustment of either ignition timing, air-fuel ratio, or fuel injection timing under conditions of heavy load or rapid acceleration permits making the most economical fixed adjustment possible for these functions under conditions of normal operation. For example, in the case of spark ignition, the normal "advance" of the distributor setting may be increased by a considerable number of degrees of crankshaft rotation for average operation, resulting in average increased power, smoother performance, and a saving in fuel. An additional advantage lies in the fact that various fuels having different anti-knock ratings may be employed without the necessity for manual adjustment of the engine subassemblies to obtain best results. Since fuel injection timing in compression ignition engines is directly associated with causes of detonation as well as with means for providing smooth operation, automatic adjustment of this function is desirable for the same reasons stated above in connection with adjustment of spark timing. Under certain conditions enrichment of air-fuel mixtures reduces or precludes detonation. Automatic adjustment of this feature under conditions conducive to detonation obviously is also desirable.

Practical applications of the complete device disclosed herein necessitates a durable design of the apparatus and particularly a means of maintaining permanently accurate calibration of the balancing air pressure admitted to the upper side of diaphragm 8 (Figure 1). It is believed that the most positive and lasting means of providing such calibrations is through use of the acceleration of gravity itself which is exceptionally constant for all practical purposes involving forces of the magnitude employed by this device. Hence, "weights" 39 are designed to possess a specified mass.

Obviously weights 39 may be replaced by a calibrated spring 56 (Figure 6) for use in certain applications and such substitution in the complete device disclosed herein is specifically regarded as included within the scope of the invention.

Furthermore, the use of an "outside" or external compressed air source in lieu of the integral motor 54 and air pump 53 is considered as a simple alternative within the scope of the invention. This substitution is indicated in Figure 5 in which external air pressure is admitted to the device through pipe 63, automatic regulation being effected through operation of solenoid air valve 62 as a result of closing the circuit of conductors 45 and 46.

The apparatus described herein is specific in essential detail for purposes of clearly setting forth its practicability and utility. It should be distinctly understood that this detail is representative only, and that variations thereof within the scope and purposes set forth are considered reversable hereunder.

I claim:

1. In combination with an internal combustion engine, a balanced diaphragm type of pressure-responsive unit operatively disposed in contact with combustion chamber gases, a pressure control unit pneumatically communicating with said pressure-responsive unit, electromagnetic means for regulating the operation of said engine, an electric current source connected in circuit with said pressure-responsive unit, and means responsive to the functioning of said circuit for operation of said electromagnetic means.

2. In combination with an internal combustion engine, a balanced diaphragm type of engine indicator pressure-responsive unit operatively disposed in contact with combustion chamber gases, a balancing pressure control unit connected pneumatically with said pressure-responsive unit, said pressure control unit being operatively connected in electric circuit with a current source, electromagnetic and mechanical means for regulating selected operational subassemblies of said engine, an electric current source connected in circuit with said pressure-responsive unit, and electric relay means for operation of said electromagnetic and mechanical means.

3. In combination with an internal combustion engine, a pressure-responsive electrical contact unit containing a diaphragm exposed to combustion chamber gas pressure on one side, and controlled pneumatic balancing pressure on the other side, said contact unit also containing an electric conductor operatively located for closing an electric circuit upon movement of said diaphragm in contact therewith, means for maintaining a predetermined balancing pneumatic pressure against said diaphragm, electromagnetic means for performing selected engine operating adjustments, and an electric current source connected in said electric circuit and in operating circuit with said electromagnetic means, said operating circuit being arranged to respond to functioning of first said circuit.

4. In combination with an internal combustion engine, a pressure-responsive electrical contact unit containing a diaphragm exposed to combustion chamber gas pressure on one side and controlled balancing pneumatic pressure on the other side, said contact unit also containing an electric conductor operatively located for closing an electric circuit upon movement of said diaphragm into contact therewith, means for maintaining a predetermined balancing pneumatic pressure against said diaphragm, an electric current source connected in said electric circuit and electromagnetic means responsive to the operation thereof for automatically performing adjustment of air-fuel ratio.

5. In combination with an internal combustion engine means responsive to balanced air pressure control for eliminating detonation and comprising a flexible gas retaining member; electric contacts operatively disposed to function in response to expansion or contraction of said retaining member, air pressure supply means operatively connected in electric circuit with a current source and said electric contacts, said air pressure supply means being pneumatically connected to said gas retaining member and also to a balanced diaphragm pressure responsive device, the latter being disposed in contact with combustion chamber gas pressure and also connected in electric circuits for control of engine regulating devices.

6. In combination with an internal combustion engine means responsive to controlled air pressure for eliminating detonation and comprising a flexible gas retaining member and means for exerting a measured mechanical compressing force thereon; electric contacts operatively disposed to function in response to expansion or contraction of said retaining member, air pressure supply means operatively connected in electric circuit with a current source and said electric contacts, said air pressure supply means being pneumatically connected to said gas retaining member and also to a balanced diaphragm pressure responsive device, the latter being disposed in contact with combustion chamber gas pressure and also connected in electric circuits for control of engine regulating devices.

7. In combination with an internal combustion engine means responsive to controlled air pressure for eliminating detonation and comprising a power driven air pressure source, pneumatic connection between said source and a pressure regulator, said regulator being operably communicative with said air pressure source for controlling the operation thereof; said pneumatic connection also communicating with a balanced diaphragm type of engine indicator unit inserted in the engine cylinder head, and electric means responsive to the operation of said unit for control of engine regulating devices.

8. In combination with an internal combustion engine means responsive to controlled air pressure for eliminating detonation and comprising a power driven air pressure source, pneumatic connection between said source and a pressure regulator said regulator being operably connected with said air pressure source for controlling the operation of same; said pneumatic connection between said source and said regulator also communicating with a balanced diaphragm type of engine indicator unit inserted in the engine cylinder head, and electric circuit means for energizing electric solenoids in response to the circuit closing action of said engine indicator unit, said solenoids being the direct means of operating engine regulating accessories.

9. In combination with an internal combustion engine means responsive to controlled static air pressure for eliminating detonation and comprising an automatic pressure regulating device having a housing, an air pressure source, a flexible gas retaining cell, means for supporting said cell within said housing to permit expansion or contraction of the former in accordance with an increase or decrease of said air pressure, a calibrated spring mounted in said housing and arranged to adjustably effect a compressing force on said flexible cell, electric contact means responsive to the movement of said cell and a circuit connected with an electric current source and said air pressure source together with said contacts for controlling the operation of said source in response to contraction or expansion of said cell, flexible pneumatic tube connecting means communicating between said pressure source, said cell, and a balanced diaphragm type of engine indicator unit inserted in the engine cylinder head, and an electric circuit responsive to the contact opening and closing operation of said indicator unit for operation of engine regulating accessory and attached devices.

10. In combination with an internal combustion engine, means responsive to controlled pneumatic pressure for eliminating detonation and comprising a pressure regulating unit having a housing, an integral air pressure source, a flexible gas retaining member, means for exerting a measured compression force on said member, pneumatic tube connection between said member and said pressure source, electric contacts operable due to movement of said member in accordance with an increase or decrease of pneumatic pressure therein, said contacts being the means for electrical control of the operation of said pressure source, pneumatic communicating means between said flexible gas retaining member and a balanced diaphragm type of engine indicator unit inserted in the cylinder head of said engine, and an electric circuit being opened or closed by a second set of electric contacts contained in said indicator unit to cause a current to flow for operating engine regulating devices.

11. In combination with an internal combustion engine means responsive to controlled pneumatic pressure for eliminating detonation and comprising a pressure regulating unit having a housing, an air pressure source, a flexible gas retaining member, means for supporting calibrated weights on said member, means for supporting said member in a cushioned support and in a manner permitting said member to seek a vertical position irrespective of the position of said housing, flexible pneumatic tube connecting means communicating between said pressure source and said member, electric contacts operative as a result of movement of said member due to an increase or decrease of pneumatic pressure therein, said contacts being connected to said pressure source for electrical operating control thereof, pneumatic communicating means between said flexible gas retaining member and a balanced diaphragm type of engine indicator unit inserted in the engine cylinder head, and an electric circuit operated by the action of said indicator unit to cause a current to flow for actuating engine regulating accessories and devices.

CHARLES W. MacMILLAN.

REFERENCES CITED

The following references are of record in the file of this patent:

UNITED STATES PATENTS

| Number | Name | Date |
| --- | --- | --- |
| 1,612,494 | Cutler | Dec. 28, 1926 |
| 2,150,075 | Mennesson | Mar. 7, 1939 |
| 2,220,558 | Van Dijck et al. | Nov. 5, 1940 |
| 2,373,685 | Jarvis | Apr. 17, 1945 |
| 2,394,792 | MacMillan | Feb. 12, 1946 |